(12) United States Patent
Griffin et al.

(10) Patent No.: US 6,255,429 B1
(45) Date of Patent: Jul. 3, 2001

(54) AMINE-, POLYOL-, AMIDE-FUNCTIONAL SILOXANE COPOLYMERS AND METHODS FOR THEIR PREPARATION

(75) Inventors: Howard Edwin Griffin, Greensboro, NC (US); Linda Denise Kennan, Midland, MI (US); Michael Ward Skinner, Midland, MI (US); Kenneth Edward Zimmerman, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/389,143

(22) Filed: Sep. 2, 1999

(51) Int. Cl.[7] .................................................. C08G 77/38
(52) U.S. Cl. ................................ 528/25; 528/26; 528/27; 528/38; 556/413; 556/419; 8/DIG. 1
(58) Field of Search .................................. 528/26, 27, 38; 556/413, 419; 8/DIG. 1

(56) References Cited

U.S. PATENT DOCUMENTS

| 4,311,626 | 1/1982 | Ona et al. | 260/29.2 |
|---|---|---|---|
| 4,409,267 | 10/1983 | Ichinohe et al. | 427/387 |
| 4,680,366 | 7/1987 | Tanaka et al. | 528/27 |
| 4,757,121 | 7/1988 | Tanaka et al. | 528/27 |
| 4,978,561 | * 12/1990 | Cray et al. | |
| 5,118,535 | 6/1992 | Cray et al. | 427/387 |
| 5,258,451 | 11/1993 | Ohsawa et al. | 524/755 |
| 5,593,611 | 1/1997 | Czech | 252/8.63 |

FOREIGN PATENT DOCUMENTS 0 399 706 A2   11/1990   (EP) ............................ D06M/15/643

OTHER PUBLICATIONS

"Structure Activity Relationships of Aminofunctional Siloxanes as Components in Softening Finishes", Textile Chemist and Colorist, by Latenschlager et al., published Mar. 1995, vol. 27, No. 3.

* cited by examiner

Primary Examiner—Robert Dawson
Assistant Examiner—Marc S. Zimmer
(74) Attorney, Agent, or Firm—Charles R. Richard

(57) ABSTRACT

An amine-, polyol-, amide-, dimethyl-functional siloxane copolymer and a method for its preparation are disclosed. The copolymer is suitable for use in fiber treatment compositions. The copolymer provides good hand, resistance to yellowing, and hydrophilicity to fibers treated therewith.

18 Claims, No Drawings

AMINE-, POLYOL-, AMIDE-FUNCTIONAL SILOXANE COPOLYMERS AND METHODS FOR THEIR PREPARATION

FIELD OF THE INVENTION

This invention relates to an amine-, polyol-, amide-functional siloxane copolymer and a method for its preparation. More particularly, this invention relates to an amine-, polyol-, amide- functional siloxane copolymer that is suitable for use in fiber treatment compositions.

BACKGROUND OF THE INVENTION

There is a growing need in the textile market for siloxane fabric softeners that not only provide softening but also impart hydrophilicity and other desirable properties to the treated fabric. Using a conventional siloxane polymer as the active ingredient in a fabric treatment agent often requires a trade-off in properties.

Amine-functional polysiloxanes are known to improve the hand of textiles. 'Hand' means the softness and smoothness of the textile. The hand of a treated textile is directly related to the amine content (e.g., the number of amino-functional groups) of the polysiloxane. Generally, as the amine content increases, the hand of the textile improves.

One method to produce amine-functional siloxane compounds for use as fabric treatment agents is to react an epoxy-functional silicone with an amine-functional organic compound. This method is described in U.S. Pat. No. 4,409,267 to Ichinohe et al., Oct. 11, 1983. The organopolysiloxane is prepared by a process comprising: 1) reacting a silanol-functional organopolysiloxane with a polyoxyalkylene compound and an epoxy-functional compound, by addition reaction, and thereafter 2) reacting an amine compound with the epoxy group of the epoxy-functional organopolysiloxane. The reactions are typically carried out in the presence of a solvent. The solvent and any impurities formed during reaction must then be removed.

U.S. Pat. No. 5,593,611 to Czech, Jan. 14, 1997, discloses a fabric treatment composition comprising an aminopolysiloxane. The aminopolysiloxane is prepared by hydrolyzing and condensing an amino-functional dialkoxysilane with water in the presence of heat and a base catalyst. The aminopolysiloxane is hydrophobic and has a molecular weight of at least 30,000.

U.S. Pat. No. 4,757,121 to Tanaka et al., Jul. 12, 1988, discloses a fiber softening composition for synthetic fibers. The composition contains a combination of 2 different amino-substituted organopolysiloxanes, an epoxy-substituted alkoxysilane, and a monoepoxy compound. The first amino-substituted organopolysiloxane is terminated with a hydroxy group or alkoxy group that reacts with the epoxy-containing alkoxysilane. This forms a film of a crosslinked composition on the fiber surface. The second amino-substituted alkoxysilane is trialkyl-silyl terminated, and the second organopolysiloxane is prepared by reacting an amino-containing organopolysiloxane with a liquid organic epoxy compound.

U.S. Pat. No. 4,680,366 to Tanaka et al., Jul. 14, 1987, discloses a fabric finishing agent containing an organopolysiloxane with primary and secondary amine-functional hydrocarbon groups and polyoxyalkylene groups. The organopolysiloxane is prepared by reacting a polyoxyalkylene glycidyl ether with an aminofunctional organopolysiloxane.

However, the amine-functional polyorganosiloxanes suffer from the drawback that as the amine content of the polyorganosiloxane increases, the tendency of the textile to discolor or yellow increases, when the amine-functional polyorganosiloxanes are used in textile treatment compositions. Additionally, the amine-functionality tends to impart hydrophobicity to the treated textile.

To minimize yellowing, it has been the practice in the textile industry to impart softness to a textile by applying a modified polysiloxane, which contains amide groups or carbamate groups instead of amine groups. However, amide and carbamate groups do not provide the same desirable level of softness characteristic of the amine groups.

For example, another method for producing amine-functional siloxanes is disclosed in "Structure Activity Relationships of Aminofunctional Siloxanes as Components in Softening Finishes", *Textile Chemist and Colorist*, by Lautenschlager et al., published March 1995, Vol. 27, No. 3. Lautenschlager et al. disclose that epoxidation is not a viable alternative to an improved softener because of impurities formed during the reaction. Alternatively, Lautenschlager et al. disclose acylated aminofunctional silicones, and a method for their preparation by acylation of an aminofunctional silicone fluid. The acylating agent can be an anhydride, lactone, or carbonate. However, the resulting acylated aminofunctional silicones exhibit a decline in hand when compared to standard aminosiloxanes.

U.S. Pat. No. 5,100,991 to Cray et al., Feb. 22, 1996, discloses compounds that can be used in fabric treatment compositions. The compounds are prepared by reacting an aminofunctional silane or siloxane with a lactone.

U.S. Pat. No. 5,118,535 to Cray et al., Jun. 2, 1992, discloses a cyclic diamine functional polydiorganosiloxane that can be used in treating fibrous materials.

EP A2 0 399 706 by Cray, published on Nov. 28, 1990, discloses a method for preparing a treatment agent for fibrous materials. The method comprises pre-reacting an amine-containing organosiloxane with a monoepoxide. The resulting product has primary, secondary, and tertiary amine groups, where up to 10% of the amine groups are primary amine groups.

U.S. Pat. No. 4,311,626 to Ona et al., Jan. 19, 1982, discloses a fiber treatment composition containing an aminofunctional polydiorganosiloxane and a carboxylfunctional polydiorganosiloxane. However, carboxyl groups detrimentally affect the hand of the treated fibers.

However, none of these references disclose a siloxane copolymer having amine-, polyol-, and amide-functional groups. Therefore, it is an object of this invention to provide an amine-, polyol, amide-, dimethyl-functional siloxane copolymer. It is a further object of this invention to provide an amine-, polyol-, amide-, dimethyl-functional siloxane copolymer that can be used in fiber treatment compositions.

SUMMARY OF THE INVENTION

This invention relates to a siloxane copolymer having amine-, polyol, and amide-functionalities. The combination of amine-, polyol-, and amide-functionalities provides a synergistic effect in fiber treatment compositions containing the copolymer. The synergistic effect is that the copolymer provides resistance to yellowing and provides hydrophilicity to the treated fiber without significant detriment to the hand of the fiber. This invention further relates to a method for preparing the amine-, polyol-, amide-functional siloxane copolymer.

DETAILED DESCRIPTION OF THE INVENTION

This invention relates to an amine-, polyol-, amide-functional siloxane copolymer. The copolymer has the general formula:

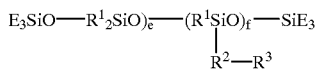

where each E is independently selected from the group consisting of monovalent hydrocarbon groups, hydroxyl groups, and alkoxy groups; each $R^1$ is independently a monovalent hydrocarbon group; each $R^2$ is independently a divalent hydrocarbon group having 1 to 10 carbon atoms; each $R^3$ is generally a heterocyclic nitrogen-containing compound, which may be, e.g.,

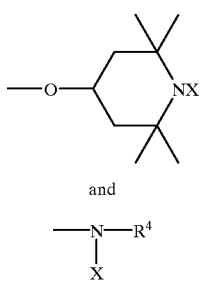

and

—N—$R^4$
  |
  X where each $R^4$ is independently selected from the group consisting of a hydrogen atom, a monovalent hydrocarbon and a group of formula —$R^2NX_2$, where each X is independently a hydrogen atom or X', with the proviso that not all X=hydrogen, and each X' is independently selected from the group consisting of groups of the formula

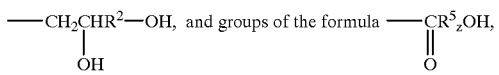

with at least one of each of the above X' alternatives being present, where each $R^2$ is as described above, each $R^5$ is independently a divalent hydrocarbon group of 1 to 7 carbon atoms, z is an integer from 1 to 7; e is 25 to 1,000; and f is 0.1 to 200. Preferably, e is 75 to 400, and f is 0.85 to 20. Typically, the amount of X and X' represented by groups of the formula

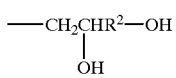

is 0.1 to 2.9 mol %, preferably 0.9 to 2.1 mol %, of the copolymer molecule. Typically, the amount of X and X' represented by groups of formula

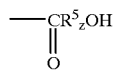

is 0.01 to 2.9 mol %, preferably 0.01 to 0.05 mol %, of the copolymer molecule.

Each $R^1$ is independently a monovalent hydrocarbon group. $R^1$ is exemplified by alkyl such as methyl, ethyl, propyl, butyl, pentyl, and hexyl; aryl such as phenyl, tolyl, and xylyl; and aralkyl such as benzyl and phenethyl. Alkyl groups are preferred, and methyl is particularly preferred.

Each $R^2$ is independently a divalent hydrocarbon group of 1 to 10 carbon atoms.

The divalent groups are exemplified by alkylene groups such as ethylene, propylene, butylene, isobutylene, and methylpropylene; and alkylene-arylene groups expressed by the formula —$(CH_2)_2$—$C_6H_4$. Alkylene groups such as ethylene, propylene, and isobutylene groups are preferred.

Each E is independently selected from the group consisting of monovalent hydrocarbon groups, hydroxyl groups, and alkoxy groups. Preferably, the alkoxy groups have 10 to 15 carbon atoms.

Each $R^5$ is independently a divalent hydrocarbon groups of 1 to 7 carbon atoms, and z is an integer from 1 to 7. $R^5$ is exemplified by ethylene, propylene, butylene, and isobutylene.

Preferably, the group represented by general formula

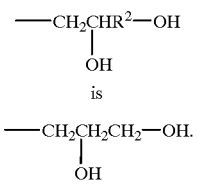

is

—$CH_2CH_2CH_2$—OH.
           |
           OH

Preferably, the group represented by general formula

—$CR^5_zOH$
  ‖
  O is

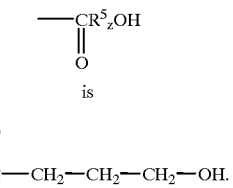

This invention further relates to a method for preparing the amine-, polyol-, amide-functional siloxane copolymer. The method comprises reacting
(i) an amine-functional siloxane;
(ii) an epoxy-functional compound; and
(iii) a material selected from the group consisting of lactones, anhydrides, and carbonates. Typically, the amount of component (i) is 90 to 99 wt %, the amount of component (ii) is 0.5 to 9 wt %, and the amount of component (iii) is 0.1 to 5 wt %.

Component (i) is an amine-functional siloxane. Component (i) can be prepared by base equilibration using a catalyst known in the art. A preferred method comprises heating to 150° C., a composition comprising a polydiorganosiloxane; an endblocker, such as hexamethyldisiloxane; an amine-functional silane or amine-functional siloxane; and water in the presence of the catalyst. While heating, a mild strip is applied to the system to remove by-products such as water and alcohol. After formation of component (i), the reaction mixture can be stripped to remove low boiling impurities from component (i).

In a particularly preferred embodiment of the invention, component (i) is prepared by a condensation reaction process. The condensation reaction process comprises:
I) heating a mixture comprising silanol-endblocked polydimethylsiloxane, an alcohol, and an aminosilane, in the presence of a catalyst, and thereafter
II) gradually reducing pressure to promote condensation polymerization by removing by-products from the reaction mixture.

Preferably, the alcohol comprises a blend of linear alcohols. The catalyst used in step I) is selected from the group consisting of barium hydroxide, trisodium orthophosphate, and combinations thereof. The mixture in step I) is heated for a period of time to complete the condensation reaction in step II). Typically, the mixture is heated up to 85° C. for up to 3 hours.

The by-products formed in step II) are water and alcohol. Pressure in step II) is typically reduced down to 200 mBar. After the viscosity of the product of step II) is stabilized, pressure is returned to ambient and the product is cooled in an inert atmosphere.

Component (i) has the general formula

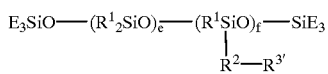

where $R^1$, $R^2$, e, and f are as described above. $R3'$ is generally a heterocyclic nitrogen-ontaining compound, which may be, e.g.,

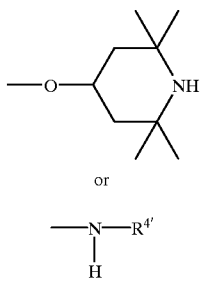

where each $R^{4'}$ is selected from the group consisting of a hydrogen atom, a monovalent hydrocarbon and a group of formula —$R^2NH_2$.

When (i) the amine-fuinctional siloxane is prepared by the base equilibration process, each E is a monovalent hydrocarbon group, preferably an alkyl or aryl group. When the amine-functional siloxane is prepared by condensation reaction, each E is independently selected from the group consisting of monovalent hydrocarbon groups, hydroxyl groups and alkoxy groups.

Component (ii) is an epoxy-functional compound having the general formula:

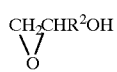

where $R^2$ is a divalent hydrocarbon group as described above. Suitable epoxy-functional compounds include glycidol, 2,3-epoxy-cyclopentanol, and 3,3-epoxy-6-methylcyclohexylmethanol. Glycidol is preferred.

Component (iii) is selected from the group consisting of anhydrides, carbonates, and lactones.

Lactones are preferred as component (iii). Suitable lactones are disclosed in U.S. Pat. No. 5,100,991 to Cray et al., Mar. 31, 1992, which is hereby incorporated by reference. Suitable lactones have the formula

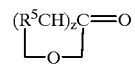

where $R^5$ and z are as described above. Preferably, each $R^5$ represents a hydrogen atom and z is 3 to 6. The lactone is exemplified by butyrolactone, epsilon caprolactone, and delta gluconolactone. Butyrolactone and epsilon caprolactone are particularly preferred.

The copolymer can be prepared by reacting (i) the amine-functional siloxane with (ii) the epoxy-functional compound and (iii) the material selected from the group consisting of anhydrides, carbonates, and lactones; where components (i), (ii), and (iii) are combined at the same time, to produce the amide-, and polyol-functionalities of the siloxane copolymer in one step. Typically, components (i), (ii), and (iii) are heated to 80 to 100° C. for several hours to prepare the copolymer by this method.

Alternatively, the copolymer can be prepared by the steps of:

(1) reacting (i) the amine-functional siloxane with (ii) the epoxy-functional compound; yielding a reaction product that is an amine-, polyol-functional siloxane; and thereafter (2) reacting the reaction product of (i) and (ii) with (iii) the material selected from the group consisting of anhydrides, carbonates, and lactones; yielding an amine-, polyol-, amide-functional siloxane copolymer. (Also, the copolymer can be prepared by reacting the reaction product of (i) and (iii) with (ii)).

When the copolymer is prepared by this method, components (i) and (ii) are typically heated to 80 to 115° C. for several hours. The reaction product of (i) and (ii) is then reacted with component (iii) by heating at 100° C. for several hours.

Preferably, the amine-, polyol-functional siloxane of step (1) is prepared by reacting (i) the amine-functional siloxane with (ii) the epoxy-ftinctional compound to form the amine-, polyol-functional siloxane reaction product of step (1). This method is exemplified in European Patent Application No. 0 399 706 A2, published on Nov. 28, 1990.

The amine-, polyol-functional siloxane reaction product formed in step (1) has the formula:

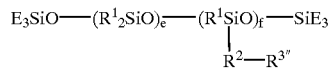

where $R^1$, $R^2$, E, e, and f are as described above, and each $R^{3''}$ is generally a heterocyclic nitrogen-containing compound, which may be, e.g.,

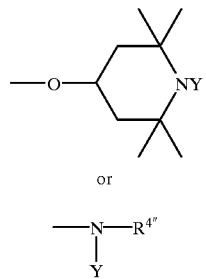

where each $R^{4''}$ is selected from the group consisting of a hydrogen atom and a group of formula —$R^2NY_2$, where each Y is independently a hydrogen atom or Y', each Y' is a group of the formula

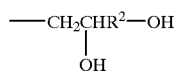

where each $R^2$ is a divalent hydrocarbon group as described above.

In step (2), the amine-, polyol-functional siloxane reaction product is then reacted with (iii) the material selected from the group consisting of anhydrides, carbonates, and lactones described above. Preferably, a lactone is reacted with the amine-, polyol-functional siloxane to produce the amine-, polyol-, amide-functional siloxane copolymer. A preferred method for forming an amide-functional group by reaction of an amine-functional group with a lactone can be found in U.S. Pat. No. 5,100,991 to Cray et al., which is hereby incorporated by reference.

EXAMPLES

These examples are intended to illustrate the invention to those skilled in the art and should not be interpreted as limiting the scope of the invention set forth in the claims.

Example 1

Sample 1 was prepared as follows. Hydroxy-terminated dimethylsiloxane having viscosity of 70 cSt at 25° C. (216.07 g), aminoethylaminoisobutylmethyldimethoxysilane (14.08 g), polydimethylsiloxane fluid having viscosity of 15 cSt at 25° C. (21.79 g), deionized water (5.0 g), and hydroxy-terminated with tetrabutylphosphonium chloride dimethylsiloxane (2.5 g), were combined in a 500 mL flask equipped with a condenser, and a Dean Stark trap. This combination was heated at 115° C. for 4 hours, and then heated to 150° C. for 1 hour. The resulting polymer was stripped by heating at 150° C. under full vacuum, and the stripped polymer was cooled to 80° C.

Glycidol (9.48 g) was added to the stripped polymer. The glycidol and polymer were heated at 115° C. for 4 hours. The resulting polymer was cooled to 100° C.

Butyrolactone (0.92 g) was added to the polymer. The polymer and butyrolactone were heated at 100° C. for 4 hours.

The resulting copolymer had the formula:

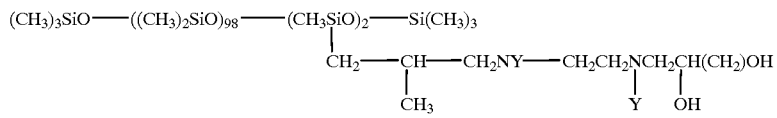

where 50% of Y is hydrogen and 50% of Y has formula:

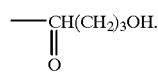

Example 2

Sample 2 was prepared as follows. Hydroxy-terminated dimethylsiloxane having viscosity of 70 cSt at 25° C. (216.07 g), aminoethylaminoisobutylmethyldimethoxysilane (14.08 g), polydimethylsiloxane fluid having viscosity of 15 cSt at 25° C. (21.79 g), deionized water (5.0 g), and hydroxy-terminated with tetrabutylphosphonium chloride dimethylsiloxane (2.5 g), were combined in a 500 mL flask equipped with a condenser, and a Dean Stark trap. This combination was heated at 115° C. for 4 hours, and then heated to 150° C. for 1 hour. The resulting polymer was stripped by heating at 150° C. under full vacuum, and the stripped polymer was cooled to 80° C.

Glycidol (9.48 g) and butyrolactone (0.92 g) were added to the stripped polymer. The glycidol, butyrolactone, and polymer were heated to 100° C. for 4 hours.

The resulting copolymer had the formula:

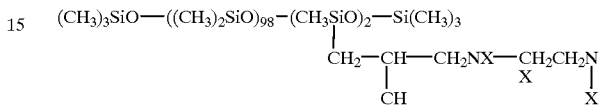

where 27% of X is hydrogen, 68% of X is

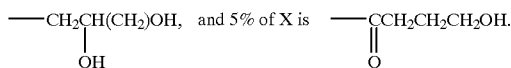

Example 3—Preparation of Emulsions

Samples 1 and 2 were used as the active ingredient in emulsion samples 4-1 and 4-2, respectively. The emulsion samples were prepared by the following method.

1. The active ingredient was combined with 2 surfactants and a first charge of acid, and this mixture was stirred for 5 to 10 minutes. The surfactants used were GENAPOL® UD 050 and GENAPOL® UD 110. GENAPOL® UD 050 and GENAPOL® UD 110 are ethoxylated C11 branched and linear alcohols having CAS No. 127036242, available from Hoechst Celanese. The acid was glacial acetic acid.
2. A first water charge was added to the mixture from step 1, and the resulting mixture was stirred for 30 minutes.
3. A second water charge was added to the mixture from step 2, and the resulting mixture was stirred for 30 minutes.
4. A second acid charge and a third water charge were added to the mixture from step 3. The resulting mixture was stirred for 1 hour.

The amounts of each ingredient added are in Table 1. The amounts are in weight % of the resulting emulsion. The appearance of each emulsion is in Table 2.

The emulsions were formulated to provide 1 wt % of the active ingredient on the fiber to which they were applied.

TABLE 1

Emulsion Formulation

| Ingredients | Weight % |
|---|---|
| Active Ingredient | 20% |
| GENAPOL ® UD 050 | 3% |
| GENAPOL ® UD 110 | 7% |

TABLE 1-continued

Emulsion Formulation

| Ingredients | Weight % |
|---|---|
| 1$^{ST}$ Acid Charge | 0.1% |
| 1$^{ST}$ Water Charge | 4% |
| 2$^{ND}$ Water Charge | 45.9% |
| 2$^{ND}$ Acid Charge | 0.3% |
| 3$^{RD}$ Water Charge | 19.7% |

Comparative Example 1

Sample C1 was prepared by the method in Example 3, except that the active ingredient was a reaction product of dimethyl methyl(aminoethylaminoisobutyl) siloxane reaction with olycidol.

The reaction product had the formula:

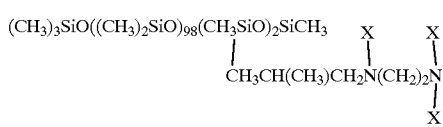

where 33% of X is hydrogen, and 66% of X is

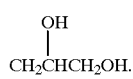

Comparative Example 2

Sample C2 was prepared by the method of Example 3, except that the active ingredient was

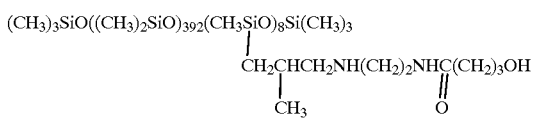

Example 4—Evaluation of Emulsion Samples

Each emulsion from example 3 was applied to 100% cotton interlock knit fabric (TESTFABRICS® style #460). The treated fabric was dried at 150° C. for 3 minutes. The treated fabric was then conditioned at room temperature overnight.

The whiteness index, hand, and absorbency were then measured on each sample. Whiteness index indicates the degree of departure of an object color from that of a preferred white. Whiteness index is a dimensionless number computed from calorimetric data. Whiteness index was determined by averaging the results of 3 readings per sample with a HUNTERLAB® colorimeter, as described in ASTM E 313-96.

Hand is a relative measurement provided by a group of 4 evaluators. Hand of each sample is ranked on a scale of 1 to X, X being the number of samples evaluated relative to each other. A rating of 1 indicates the best hand, i.e. softest and smoothest feel, and higher numbers indicate decreasing hand.

Absorbency is measured by AATCC (American Association of Textile Chemist and Colorist) Test Method 79-1995-Absorbance of Bleached Textiles. In this method, a drop of water is allowed to fall from a fixed height onto the taut surface of a fabric test specimen. The time required for the specular reflection of the water drop to disappear is measured and recorded as wetting time. Absorbency was measured after conditioning at room temperature overnight.

Comparative Example 3

Sample C3, a sample of untreated 100% cotton knit fabric, was evaluated for absorbency, whiteness index, and hand, according to the methods in Example 4. The results are in Table 2.

TABLE 2

Water Absorbency, Whiteness Index, and Hand of Each Sample

| Sample No. | Active Ingred. | Absorbency | Whiteness Index | Hand |
|---|---|---|---|---|
| 4-1 | Copolymer 1 | 2 seconds | 67.09 | 2 |
| 4-2 | Copolymer 2 | 2 seconds | 68.02 | 1 |
| C1 | Amine-, polyol-functional siloxane | less than 1 second | 69.63 | 3 |
| C2 | Polyol-, amide-functional siloxane | less than 1 second | 68.21 | 4 |
| C3 | none | immediate | 72.63 | 5 |

N/A means the value was not tested.

We claim:

1. An amine-, polyol-, amide-functional siloxane copolymer, wherein the copolymer has the general formula:

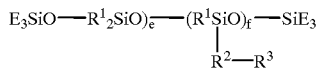

where each E is independently selected from the group consisting of monovalent hydrocarbon groups, hydroxyl groups, and alkoxy groups; each $R^1$ is independently a monovalent hydrocarbon group; each $R^2$ is independently a divalent hydrocarbon group having 1 to 10 carbon atoms; each $R^3$ is a heterocyclic nitrogen-containing compound including

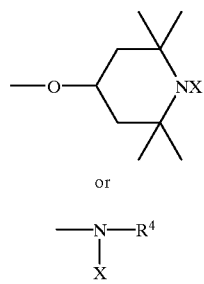

where each $R^4$ is independently selected from the group consisting of a hydrogen atom, a monovalent hydrocarbon and a group of formula —$R^2NX_2$, where each X is independently a hydrogen atom or X', with the proviso that not all X=hydrogen, each X' is independently selected from the group consisting of groups of the formula —CH$_2$CHR$^2$—OH, and groups of the formula —CR$^5_z$OH,
|
OH
||
O with at least one of each of the above X' alternatives being present, where each R$^2$ is as described above, each R$^5$ is independently a divalent hydrocarbon group of 1 to 7 carbon atoms, z is a integer from 1 to 7; e is 25 to 1000; and f is 0.1 to 200.

2. The copolymer of claim 1, wherein the copolymer contains 0.1 to 2.9 mol % of X and X' groups of the formula

CH$_2$CHR$^2$—OH.
|
OH

3. The copolymer of claim 1, wherein the copolymer contains 0.01 to 2.9 mol % of X and X' groups of the formula —CR$^5_z$OH.
||
O 4. The copolymer of claim 1, wherein R$^1$ is an alkyl group; R$^2$ is an alkylene group; each X' is independently selected from the group consisting of —CH$_2$CH$_2$CH$_2$—OH, and
|
OH

O
||
—C—CH$_2$—CH$_2$—CH$_2$—OH;

each X is selected from the group consisting of hydrogen and X'; e is 75 to 400, and f is 0.75 to 20.

5. The copolymer of claim 3, wherein R$^1$ is a methyl group.

6. A method for preparing an amine-, polyol-, amide-functional siloxane copolymer, wherein the method comprises reacting:

(i) an amine-functional siloxane of general formula

E$_3$SiO—(R$_2^1$SiO)$_e$—(R$^1$SiO)$_f$—SiE$_3$
|
R$^2$—R$^{3'}$ where R$^1$ is a monovalent hydrocarbon group, R$^2$ is a divalent hydrocarbon group having 1 to 10 carbon atoms, each E is independently selected from the group consisting of monovalent hydrocarbon groups, hydroxyl groups, and alkoxy groups, e is 25 to 1,000, and f is 0.1 to 200; R$^{3'}$ is a heterocyclic nitrogen-containing compound including

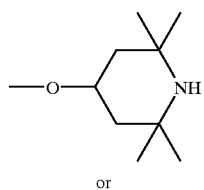
or

—N—R$^{4'}$
|
H where each R$^{4'}$ is independently selected from the group consisting of a hydrogen atom, a monovalent hydrocarbon and a group of formula —R$^2$NH$_2$; and (ii) an epoxy-functional compound of formula

CH$_2$CHR$^2$OH
\/
O where R$^2$ is a divalent hydrocarbon group as described above; and (iii) a material selected from the group consisting of lactones, anhydrides, and carbonates.

7. The method of claim 6, wherein R$^1$ is methyl.

8. The method of claim 6, wherein component (i) is prepared by a base equilibration process comprising:
1) heating a composition comprising a polydiorganosiloxane, hexamethyldisiloxane, an amine compound selected from the group consisting of an amine-functional silane and an amine-functional siloxane, and water in the presence of a catalyst; and
2) applying a mild strip to the product of step 1) thereby removing by-products including water and alcohol.

9. The method of claim 6, wherein component (i) is prepared by a condensation reaction process comprising:
I) heating a mixture comprising a silanol-endblocked polydimethylsiloxane, an alcohol, and an aminosilane in the presence of a catalyst, and thereafter
II) gradually reducing pressure to promote condensation polymerization by removing by-products from the reaction mixture.

10. The method of claim 6, wherein the epoxy-functional compound is selected from the group consisting of glycidol, 2,3-epoxy-cyclopentanol, 3,3-epoxy-6-methylcyclohexylmethanol.

11. The method of claim 10, wherein the epoxy-functional compound is glycidol.

12. The method of claim 6, wherein component (iii) is a lactone of formula (R$^5$CH)$_z$C=O
|_____O_____| where R$^5$ is selected from the group consisting of hydrogen and divalent hydrocarbon groups of 1 to 7 carbon atoms and z is an integer from 1 to 7.

13. The method of claim 12, wherein each R$^5$ represents a hydrogen atom and z is 3 to 6.

14. The method of claim 12, wherein the lactone is selected from the group consisting of butyrolactone, epsilon caprolactone, and delta gluconolactone.

15. The method of claim 14, wherein the lactone is selected from the group consisting of butyrolactone and epsilon caprolactone.

16. The method of claim 6, wherein
1) the amine-functional siloxane (i) is reacted with the epoxy-functional compound (ii) thereby yielding an amine-, polyol-functional siloxane; and thereafter 2) the amine-, polyol-functional siloxane is reacted with
(iii) the material selected from the group consisting of lactones, anhydrides, and carbonates.

17. The method of claim 6, wherein (i) the amine-functional siloxane, (ii) the epoxy-functional compound, and (iii) the material selected from the group consisting of lactones, anhydrides, and carbonates are combined and reacted in one step.

18. The method of claim 6, wherein 1) the amine-functional siloxane (i) is reacted with the material selected from the group consisting of lactones, anhydrides, and carbonates (iii) thereby yielding an amine-, polyol-functional siloxane; and thereafter 2) the amine-, polyol-functional siloxane is reacted with (ii) the epoxy-functional compound.

* * * * *